UNITED STATES PATENT OFFICE.

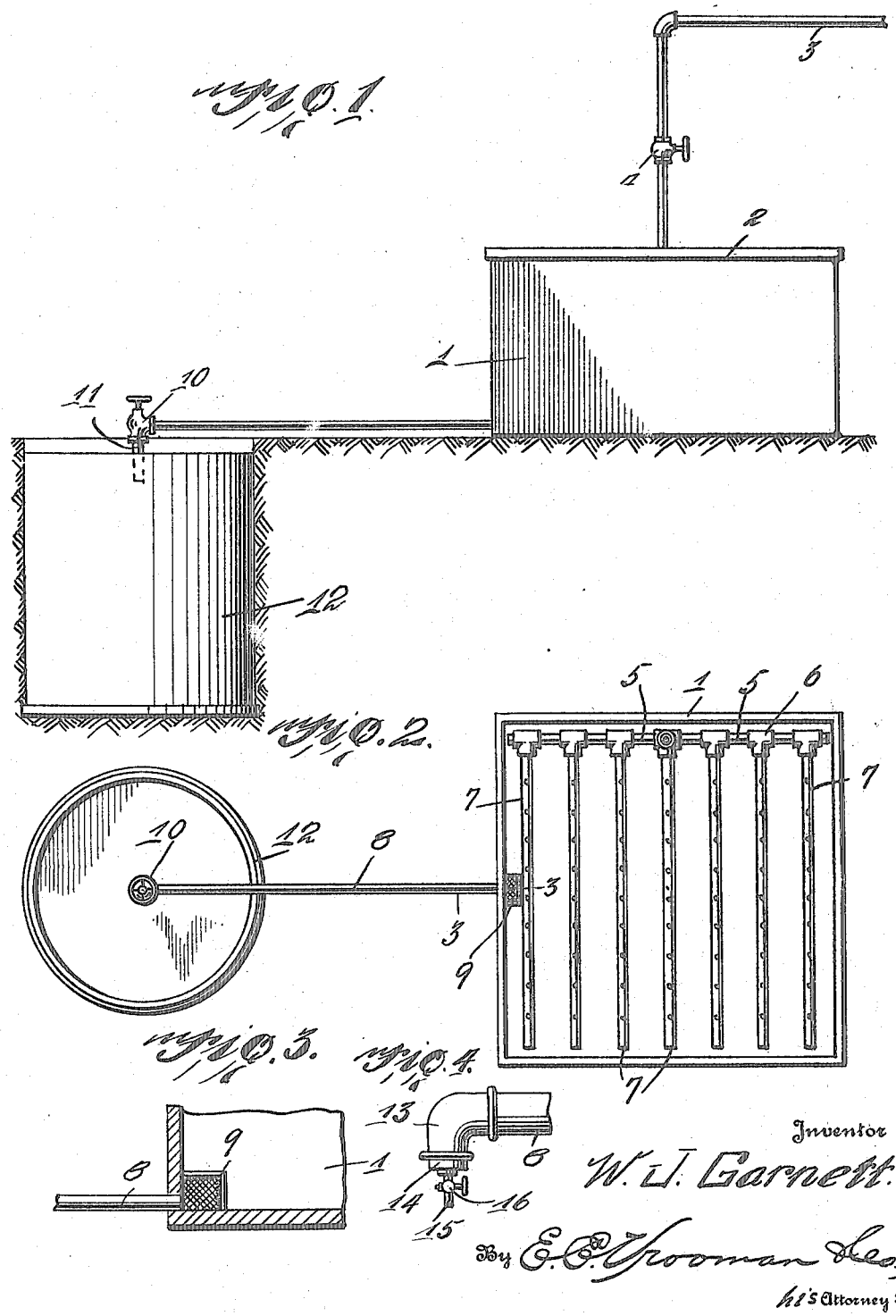

WALTER J. GARNETT, OF EASTPORT, MAINE.

APPARATUS FOR EXTRACTING OIL.

1,271,028.  Specification of Letters Patent.  Patented July 2, 1918.

Application filed October 3, 1917. Serial No. 194,606.

*To all whom it may concern:*

Be it known that I, WALTER J. GARNETT, a citizen of the United States of America, residing at Eastport, in the county of Washington and State of Maine, have invented certain new and useful Improvements in Apparatus for Extracting Oil, of which the following is a specification, reference being had therein to the accompanying drawing.

This invention relates to an apparatus for extracting oil from fish and the like and has for its object the production of a simple and efficient apparatus whereby the liquid may be readily and continually drawn from the cooking vat.

In the drawings:

Figure 1 is a side elevation of the apparatus used in connection with the present invention.

Fig. 2 is a top plan view thereof.

Fig. 3 is a section taken on line 3—3 of Fig. 2, the steam heating pipes being eliminated.

Fig. 4 is a side elevation of the discharge end of the drain pipe reduced.

By referring to the drawings it will be seen that 1 designates the cooker vat which is formed of any size or shape desired and this cooking vat 1 is provided with a cover 2 for keeping the cooking vat tight and preventing the escapement of steam which is forced therein. A steam supply pipe 3 extends down into the cooking vat 1 and this pipe 3 carries a valve 4 for the purpose of permitting the flow of steam to be controlled through the pipe 3. The pipe 3 extends down into the cooking vat and comprises a pair of laterally extending ends 5, which laterally extending ends 5 carry the T-shaped heads to which T-shaped heads 6 are secured the perforated steam discharge pipes 7, which steam discharge pipes 7 may be secured or mounted within the vat 1 in a suitable or desired manner.

A drain pipe 8 is connected to the vat 1 and the inner end of this pipe 8 is covered by a wire mesh shield 9 to prevent the clogging of this drain pipe 8. The drain pipe 8 is provided with a valve 10 at its outer end, and has a discharge pipe 11 connected thereto for the purpose of permitting drainage from the vat 1 to flow readily into a reservoir tank 12 which tank 12 is placed below the bottom of the cooking vat 1 as shown clearly in Fig. 1 of the drawings. This cooking vat 1 may be supported in any suitable or desired manner above the reservoir 12 and if it should be desired the same may be placed upon the ground such as is illustrated in Fig. 1 and the reservoir tank 12 may be placed within a pit formed in the ground as shown in Fig. 1 of the drawings.

It should be understood that the steam may be forced through the pipe 3 in any suitable or desired manner and the fish or other means from which the oil is to be extracted is placed within the cooker 1. The steam by passing into the cooker may thoroughly heat and cook the matter from which the oil is to be obtained and by opening the valve 10 this oil and surplus water may be readily drawn and constantly drawn from the cooker 1 and prevent the accumulation of oil and water within the cooker. By means of this process a higher degree of temperature may be maintained within the cooker for more efficiently cooking or extracting oil from the fish which would not be the case were the liquid maintained within the cooker 1. The process involved in the present invention comprises the placing of the fish within the cooker 1 then forcing steam into the cooker and constantly draining the liquid from the cooker for maintaining the fish in a dry state for the extraction of oil therefrom and for maintaining a high degree of temperature. The liquid of course is drained through the drain pipe 8 into a reservoir 12. The amount of drainage may be of course controlled through the medium of the valve 10.

In Fig. 4 there is shown a modified form of the invention wherein the drain pipe 8 carries an elbow 13. This elbow 13 carries a bushing 14 at its lower end into which fits a reduced discharge pipe 15. A valve 16 is carried by this reduced pipe 16 to control the flow therethrough.

The structure shown in Fig. 4 is especially adapted for use in connection with the drain pipe where it is not desired to give constant attention to the valve, for where the reduced pipe is employed, it is not necessary to give constant attention to the valve. The small drain pipe will only allow the drainage of the oil or liquid and will not permit the escapement of steam and the waste thereof.

After the material is cooked it is then transferred from the cooker to a press for extracting the remaining portion of the liquid or oil, this liquid or oil is then led from the press to the reservoir 12 in any desired manner by means of a chute or the like.

What is claimed is:

In an apparatus of the class described, the combination with a cooker vat, of a reservoir having its upper end below the plane of the bottom of said cooker vat, a drain pipe opening into the cooker vat at its bottom, and positioned above the reservoir a considerable distance by the positioning of the upper end of the reservoir below the plane of the bottom of the cooker vat, said drain pipe provided at its other end above the reservoir with an elbow, a bushing carried by the lower end of said elbow, a reduced valved discharge pipe carried by said bushing, and a steam supply pipe extending into said cooker vat.

In testimony whereof I hereunto affix my signature.

WALTER J. GARNETT.

Copies of this patent may be obtained for five cents each, by addressing the "Commissioner of Patents, Washington, D. C."